United States Patent [19]

Munson et al.

[11] 4,087,221

[45] May 2, 1978

[54] APPARATUS FOR MOLDING POWDER METAL PARTS

[75] Inventors: Harold C. Munson, Little Falls; Ronald A. Sadlon, Mohawk, both of N.Y.

[73] Assignee: Remington Arms Company, Inc., Bridgeport, Conn.

[21] Appl. No.: 764,185

[22] Filed: Jan. 31, 1977

[51] Int. Cl.$^2$ .......................... B30B 11/02; B29C 3/00

[52] U.S. Cl. ...................................... 425/78; 425/443; 425/352; 425/DIG. 58

[58] Field of Search ................. 425/78, 352, 353, 354, 425/443, DIG. 5, DIG. 58, 441

[56] References Cited

U.S. PATENT DOCUMENTS

| | | | |
|---|---|---|---|
| 2,894,287 | 7/1759 | Zeigle | 425/DIG. 58 |
| 3,020,589 | 2/1962 | Maritano | 425/443 X |
| 3,261,897 | 7/1966 | Munk | 425/DIG. 58 |
| 3,752,622 | 8/1973 | Viadana | 425/DIG. 58 X |
| 3,843,088 | 10/1974 | McLoughlin et al. | 425/DIG. 58 |
| 3,905,740 | 9/1975 | Lovejoy | 425/DIG. 58 |
| 3,922,127 | 11/1975 | Schwarzkopf | 425/78 |
| 4,019,711 | 4/1977 | Atenhof et al. | 425/DIG. 58 |

FOREIGN PATENT DOCUMENTS

| | | | |
|---|---|---|---|
| 1,456,775 | 9/1966 | France | 425/DIG. 58 |
| 1,446,025 | 8/1976 | United Kingdom | 425/DIG. 58 |

*Primary Examiner*—J. Howard Flint, Jr.
*Attorney, Agent, or Firm*—Nicholas Skovran; William L. Ericson

[57] ABSTRACT

Apparatus for forming a powder metal compact having an undercut or a reentrant angle in which the portion of the die that results in the compact undercut or reentrant angle is axially movable relative to a stationary part of the die means along the axis of pressure in order to permit automatic straight line ejection of the compact.

8 Claims, 11 Drawing Figures

FIG. 5.
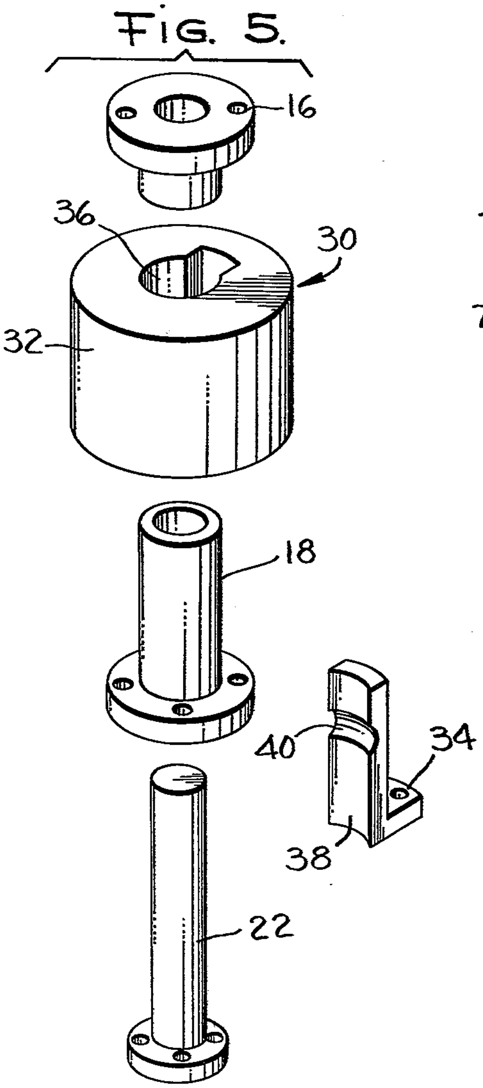
FIG. 9a.
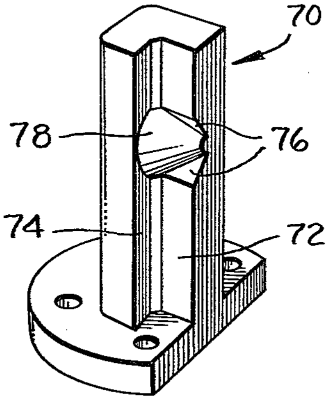
FIG. 9b.
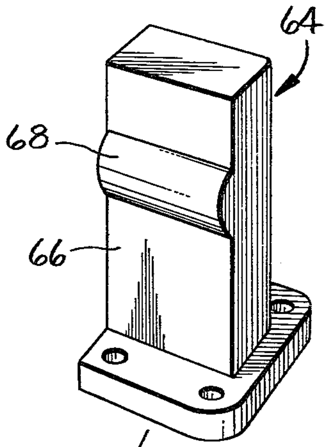
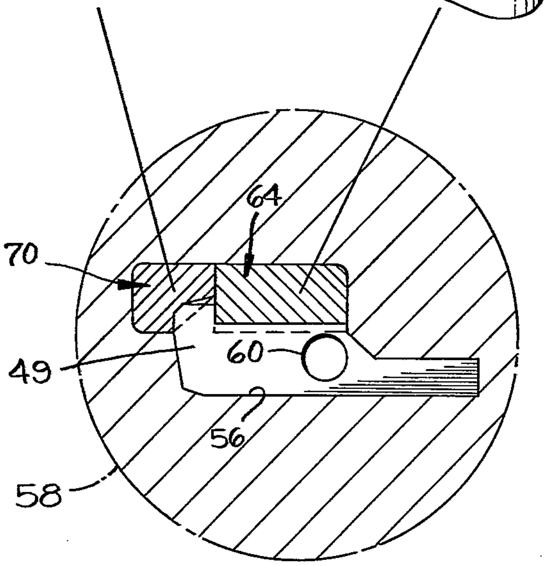
FIG. 9.
FIG. 6.
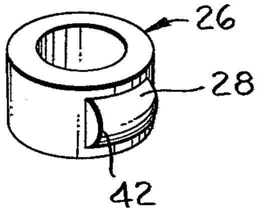
FIG. 7.
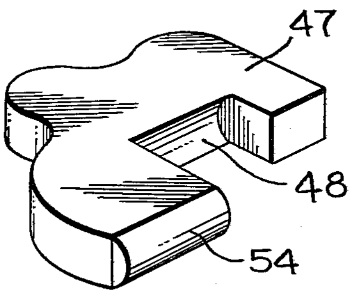
FIG. 8.
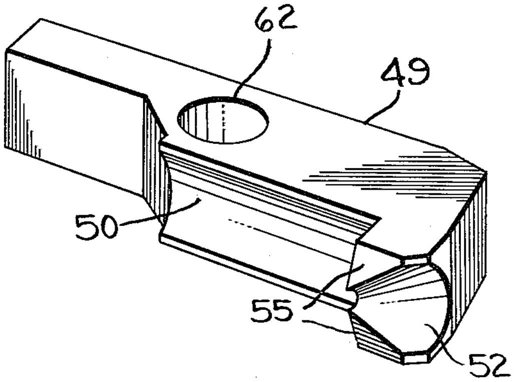

APPARATUS FOR MOLDING POWDER METAL PARTS

This invention relates in general to an apparatus for compressing powder metal into molded articles having undercuts or reentrant angles without requiring additional machining operations.

More specifically, it relates to a multi-piece die means for facilitating automatic ejection of the molded article from the die means. More specifically, the invention relates to a multi-piece die means where the part(s) of the die having the undercut(s) or reentrant angle are movable relative to the other part of the die so that the movable die part(s) and the molded article can be ejected from the die with a straight line movement along the axis of pressure.

One of the major limitations in the forming of precision powder metal parts by application of uniaxial pressure using conventional high production presses is that the shape of the part must permit ejection of the part from the die. This means that undercuts and reentrant angles on the surfaces of the part shaped by a die wall could not be formed. Instead, these parts were produced by additional machining operations or assembly of two or more parts.

On Pages 334–335 of the book "Treatise on Powder Metallurgy" by Claus G. Goetzel, Volume 1, published in 1949 by Interscience Publishers Inc., New York, N.Y., it states: "If the design requires two lateral projections on opposite ends of the longitudinal section, an undercut results that cannot be molded by regular means and must be machined in a subsequent operation (FIG. 115A). The same applies for reentrant angles and internal or external threads (FIGS. 115B and C)."

On Page 340 of the same book, it states further: "The automatic removal of the compact is essential in all production work, making it imperative to mold a part in such a manner that the largest cross section of the die will be formed on the side toward which the piece will be removed. While, on rare occasions, split dies may be used advantageously to facilitate the removal of intricate shapes (having several lateral projections), customary molding practices rule out this procedure. Therefore, any design of a metal powder part must permit unobstructed compression of the powder, as well as ejection of the compact—both to take place along the axis of pressure."

It is not known what the author has in mind when he states that "split dies" may be used to facilitate the removal of intricate shapes. However, we have successfully produced commercial quantities of powder metal parts having complex contours (shown in FIG. 6) using the multi-piece die concept of the present invention.

It is an object of the present invention to provide an apparatus of forming powder metal parts that have an undercut or a reentrant angle thereon and ejecting the part by a straight line movement along the axis of pressure.

It is another object to provide a multi-piece die means wherein the die wall surface that forms the undercut or reentrant angle is on a movable die section which is ejected with the molded part out of the remaining stationary part of the die means by a straight line movement along the axis of pressure.

Other objects and advantages will become apparent from the following description taken in conjunction with the accompanying drawing in which:

FIG. 5 is an exploded view of the apparatus of FIG. 2 in order to show the various components more clearly.

FIG. 6 is an isometric view of a modified cylindrical part which can be formed with the apparatus shown in FIG. 2.

FIG. 7 is an isometric view of a part having an undercut and a side projection that normally could not be ejected by a straight line movement along the axis of pressure.

FIG. 8 is an isometric view of another part having two recessed or depressed surfaces or undercuts.

FIG. 9 is a plan view of the part shown in FIG. 8 taken perpendicular to the axis of pressure with a three-piece die means used to form the part.

FIGS. 9*a* and 9*b* are isometric views of the two movable die sections of FIG. 9 and exploded outwardly to show their relative shapes and position more clearly.

Figure 1:
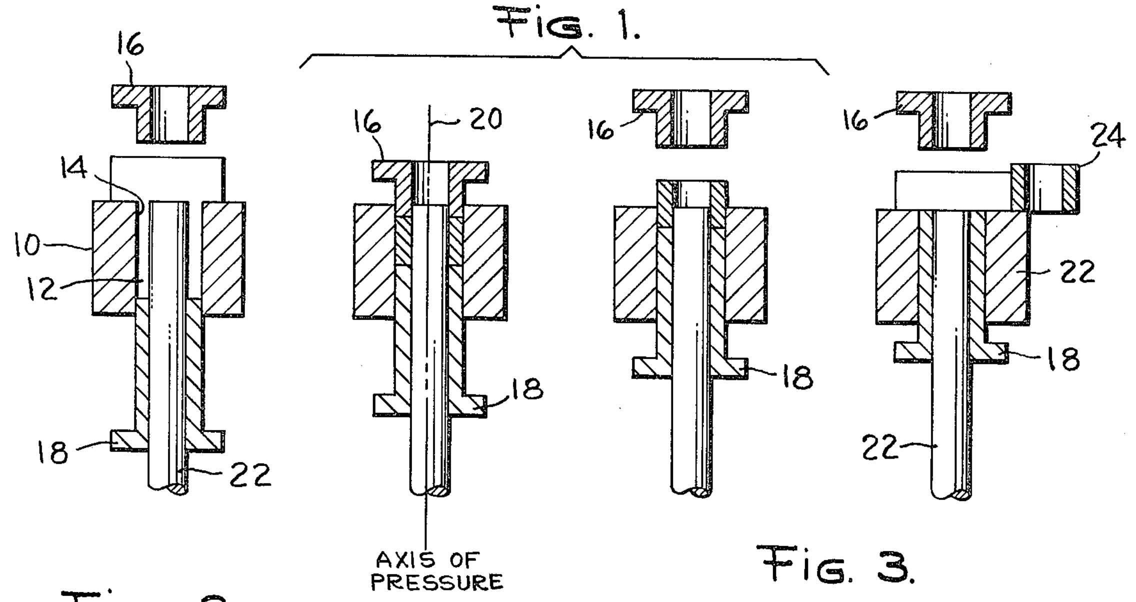
FIG. 1 is a section view of a conventional pressing cycle for a cylindrical part such as a bearing, a sleeve, or a ring.

The apparatus illustrated in FIG. 1 is conventional and is described merely to provide background for the invention. A rigid die 10 having a die opening 12 defined by a cylindrical, straight walled die surface 14 is open-ended at its forward (or upper) end in the figure and its rear (or lower) end. An upper punch 16 and a lower punch 18, having their outside diameters approximately equal to the inside diameter of the die opening 12 are slidably mounted in said opening 12. The proper amount of powder metal is dispensed into a cavity formed by the cylindrical wall surface 14 and the lower punch 18 after which the punches are moved toward each other axially to compress the powder into its final shape and dimensions. The axis on which the punches move to compress the powder is the axis of pressure 20. Although the compression of the powder can be effected by moving only the upper punch 16, the preferred practice is to move both punches toward each other in order to achieve better density distribution of the molded article.

FIG. 1 also shows a core 22 which is positioned within the die opening 12 and is spaced from the cylindrical wall surface 14 to define the inside wall of the cylindrical molded article 24. The core is necessary in this case because the molded article 24 is tubular but in many cases the articles to be made are of the type shown in FIG. 7 and core means will not be necessary. As can be seen from FIG. 1, after the forming of the article, the upper punch is moved axially out of the die opening and the lower punch is moved axially along the axis of pressure to eject the compressed part 24 from the die, whereupon it is removed by any well-known means and the lower punch is returned to its powder-receiving position.

Figure 2:
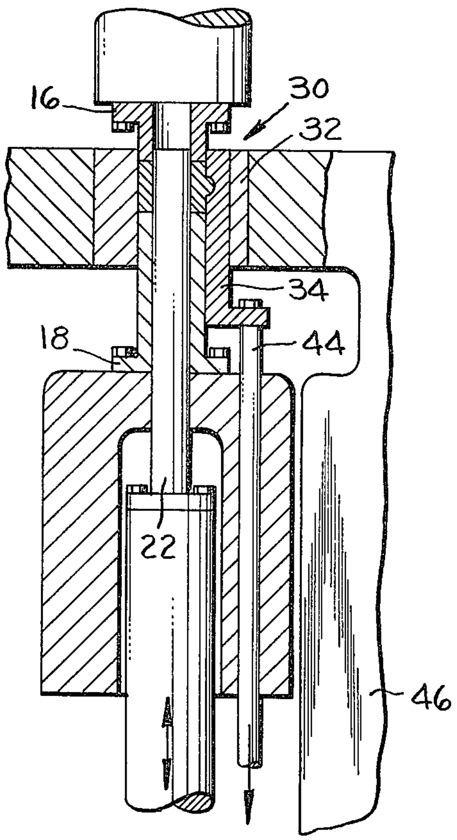
FIG. 2 is a section view of apparatus utilizing a two-piece die assembly of the present invention.
Figure 3:
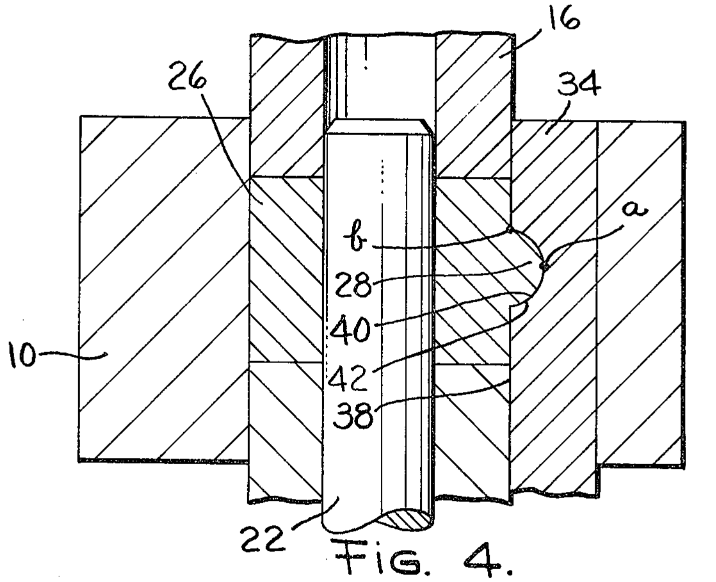
FIG. 3 is an enlarged section view of a portion of FIG. 2, i.e. the recessed surface of the die section and the projection on the compact.

FIG. 6 shows a compressed compact 26 which is similar to compact 24 of FIG. 1, except that compact 26 has an outwardly projecting portion 28. As can be seen in FIG. 2 portion 28 would prevent straight line ejection along the axis of pressure under normal or conventional practice, i.e. where the die is stationary.

FIG. 2 shows a schematic illustration of the inventive concept. The upper punch or plunger 16, the lower punch 18, and the core 22 are similar to the same parts in the conventional apparatus of FIG. 1. The difference is that in FIG. 2 the die 30 is two piece—a stationary die member 32 and a movable die section 34, which is mounted in die member 32 and movable relative thereto.

Looking at FIG. 5, it is seen that die member 32 has a side wall surface 36 and die section 34 has a side wall surface 38 which complements side wall surface 36 to form the side wall surface of the die 30. Side wall surface 38 includes a concave surface 40 which forms a convex surface 42 on outwardly projecting portion 28 of compact 26. Obviously, the surfaces 40 and 42 can be other than concave and convex. the interaction of the convex portion 28 of the compact and the concave surface of the die section results in their being locked together while the die section is within the die member, as shown in FIG. 2. However, upon completion of the compressing of the powder into the compact or compressed article, the movable die section is ejected with the compact. Upon the compact and the corresponding portion of the movable die section being ejected out of the stationary die member, the compact can be removed from the die section by any well-known means and the die section returns to its original position to form the next part. The movable die section is attached to an adjustable moving control member 44 in the press 46.

There are various contours that can be formed and ejected in similar manner. Some definition is therefore desirable. When the term "forwardly" is used in referring to the die or the compressed article, it will be understood that what is intended is the end toward which the compressed article is removed from the die. Obviously, the apparatus can be designed so that the article can be removed from the lower end of the die as well as the upper end (shown in FIG. 2). The "axis of pressure" is the axis of the punch or plunger that exerts the pressure that compresses the powder into the finished compact.

The maximum lateral point on the concave wall surface 40 of die section 34 is identified as "*a*". The concave surface meets the inner wall surface 38 past which the lower punch 18 will pass at point "*b*". The die section curved surface between points "*a*" and "*b*" constrain or prevent the adjoining portion of the convex portion 42 of the compact from moving axially relative to the die section.

Figure 4:
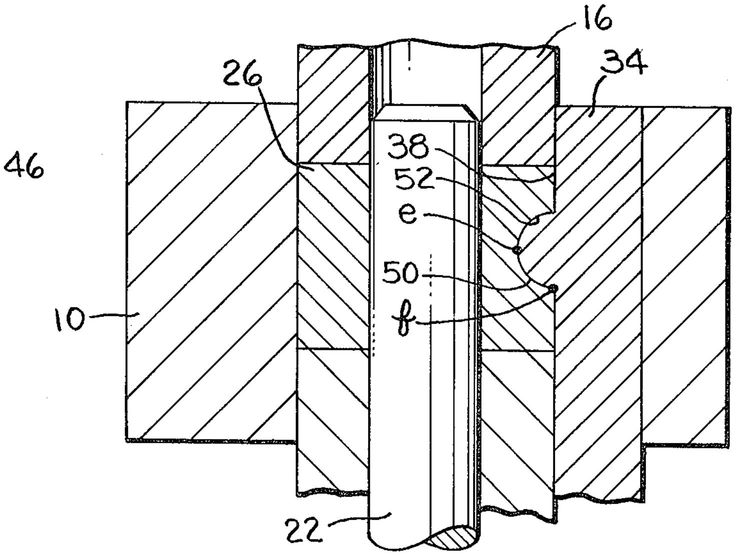
FIG. 4 is an enlarged section view similar to FIG. 3 except that the die section has a projecting surface and the compact has a depression formed thereby.

Obviously, the same result occurs when the die section has a wall surface portion that protrudes inwardly past a line projected from the outside diameter of the lower punch (in toward the axis of pressure), i.e. if the die section wall surface is convex so as to form an undercut, concave portion in the compact. Such an undercut in a compact 47 can be seen in FIG. 7 (reference numeral 48) and in compact 49 of FIG. 8 (reference numerals 50 and 52). Convex projections on the compact can be seen in FIG. 6 (reference numeral 28) and FIG. 7 (reference numeral 54). See also flat, triangular surface 55 of FIG. 8 which would prevent straight line ejection by conventional powder metallurgy practices. In a compact undercut formed by a convex portion on the die section, as explained above, the constraining portion of the die section is the portion 50 of the wall surface from the innermost point "*e*" to the rear end "*f*" of the projection, i.e. the end away from which the compact is removed. The restrained portion 52 of the compact is the associated portion formed by the constraining portion 50 (see FIG. 4).

FIG. 9 shows the use of two movable die sections to form a more complex compact 49. It can be seen that the major portion of part 49 is defined by surface 56 of stationary die 58. A conventional core pin 60 is utilized to form a vertical opening 62 in the compact. Movable die section 64 has a surface 66 which, when die section 64 is in place is parallel to the axis of pressure. The convex surface projection 68 of die section 64 forms the concave depression 50 of compact 49 (see FIG. 8). The second movable die section 70 has longitudinal surfaces 72 and 74 that are parallel to the axis of pressure, flat triangular surfaces 76 and a convex surface 78. Surface 56 of the stationary die 58, surfaces 66 and 68 of the first movable die 64, and surfaces 72, 74, 76, and 78 of the second movable die section 70 define the outside configuration and dimensions of compact 49.

Although the drawings and description above refer to concave and convex undercuts and projections because of the ease in describing the surfaces, other configurations which cannot be molded by conventional powder metallurgy techniques are possible. In general, the concept is applicable to cases where reentrant angles are present—either in the die or in the compressed compact which prevents straight line ejection from the die along the axis of pressure. Tapers and bevels, etc. can be made in this manner and it is expected that internal or external threads can also be formed using this concept.

We claim:

1. Molding apparatus for forming a powder metal article, said apparatus comprising an open-ended stationary die member having a side wall surface that extends in the direction of compression and acts as a partial cavity wall surface for the entire height of the loose powder to be pressed and which, after forming of the article, permits straight line ejection of the portion of the article formed by the stationary die wall surface, at least one die section mounted in said stationary die member, said die section being stationary during the pressing cycle but being slidably mounted in said die member during the article ejection cycle, said die section having a side wall surface that also extends in the direction of compression and which complements the stationary die wall surface to complete the cavity side wall surface, said movable die section wall surface having a constraining portion that abuts an adjacent, restrained portion of the compressed article to prevent movement of the article along the axis of pressure and relative to the die section when the die section is mounted in the stationary die member, said die section constraining portion being positioned ahead of said article restrained portion with reference to the end of the die means toward which the article is removed, means closing off the open ends of the die member and die section, said closing means comprising an upper and lower plunger means operable to move in the stationary die member and die section to define cavity end wall surfaces transverse to the axis of pressure and to compress said metal powder and form the article, and means for moving said die section and the article constrained thereby out of the stationary die member in a direction parallel to the axis of pressure to eject the article from the stationary die member.

2. Molding apparatus as recited in claim 1 wherein the wall surface of said die section includes a concave surface spaced from the ends of the die section which, when the powder metal is compressed, results in forming a convex portion on the compressed article, said constraining portion of the die section comprising the portion of the concave surface between the maximum lateral dimension of the concave surface and the end of the concave surface adjacent the end of the die section from which the article is removed.

3. Molding apparatus as recited in claim 1 wherein a portion of the die section wall surface projects outwardly relative to the axis of pressure and rearwardly relative to the ejection end of the die section resulting in an enlarged portion of the compressed article formed by said outwardly projecting wall surface, said outwardly projecting wall surface constituting said constraining portion of said die section and said enlarged portion on said article constituting said restrained portion.

4. Molding apparatus as recited in claim 1 wherein the wall surface of said die section includes a convex surface spaced from the ends of the die section which, when the powder metal is compressed, results in forming a concave portion on the compressed article, said constraining portion of the die section comprising the portion of the convex surface between the maximum lateral dimension of the convex surface and the end of the convex surface at the end of the die section opposite to the end from which the article is removed.

5. Molding apparatus as recited in claim 1 wherein a portion of the die section wall surface, spaced from the end of the die section opposite to the end of the die section from which the compressed article is removed, projects inwardly relative to the axis of pressure and rearwardly relative to the ejection end of the die section resulting in the formation of an undercut surface on said die section and an outwardly projecting portion on said article, said undercut portion of the die section wall surface constituting said constraining portion and the outwardly projecting portion of said article constituting said restrained portion.

6. Molding apparatus for compressing loose metal powder into a molded article comprising:

1. an open-ended die means comprising a stationary die member having a side wall surface that extends the full depth of a cavity into which loose metal powder is inserted prior to compression;
2. at least one die section slideably mounted in said stationary die member parallel to the axis of pressure, said die section having a side wall surface that complements said die member side wall surface to form a continuous cavity wall surface that is stationary during the pressing of the metal powder;
3. said slidable die section having a portion of its wall surface inclined to the axis of pressure so as to block the portion of the molded article formed by said inclined wall surface from moving past said die section and prevent the article from being ejected from an open end of said die means in an axial direction;
4. upper and lower plunger means defining top and bottom cavity end wall surface;
5. means for moving said plunger means in said die means for compressing the loose metal powder into a compact, molded article; and
6. means for simultaneously moving said slidable die section and said blocked molded article in an axial direction relative to said stationary die member until the die section and molded article are ejected from the stationary die member, whereupon the article can be separated from the die section.

7. Molding apparatus as recited in claim 6 wherein said inclined portion of said die section wall surface projects inwardly toward the axis of pressure resulting in the molded article having an undercut portion that extends laterally a greater distance than a part of the inwardly projecting wall surface of the die section, said inwardly projecting wall surface being positioned between the undercut portion of the molded article and the open end of the die means from which the molded article is ejected.

8. Molding apparatus as recited in claim 6 wherein said inclined portion of said die section wall surface projects outwardly from the axis of pressure and rearwardly of the open end of said die means resulting in the molded article having a portion formed by said outwardly projecting die section wall surface that is greater than the inclined wall surface portion so that said molded article cannot move past the die section when a force is exerted toward the open ejection end of the die means in an axial direction along the axis of pressure.

* * * * *